United States Patent
Sarkees

[11] 3,767,256
[45] Oct. 23, 1973

[54] SUNSHADE SUPPORT ASSEMBLY
[75] Inventor: Henry R. Sarkees, East Detroit, Mich.
[73] Assignee: General Motors Corporation, Detroit, Mich.
[22] Filed: Mar. 30, 1972
[21] Appl. No.: 239,487

[52] U.S. Cl. .............................. 296/97 K, 248/289
[51] Int. Cl. ............................................. B60j 3/02
[58] Field of Search .................. 296/97 K; 248/289, 248/288; 287/93, 14

[56] References Cited
UNITED STATES PATENTS
3,017,217  1/1962  Keating .............................. 296/97 K
2,328,360  8/1943  Rigoulot ............................. 296/97 K
2,646,241  7/1953  McLean .............................. 248/289

FOREIGN PATENTS OR APPLICATIONS
1,002,461  8/1965  Great Britain ..................... 296/97 K
  470,896  1/1951  Canada ............................ 296/97 K Primary Examiner—Leo Friaglia
Assistant Examiner—John A. Pekar
Attorney—W. E. Finken et al.

[57] ABSTRACT

A sunshade support assembly includes a base member for mounting on a vehicle roof adjacent the upper end of a windshield side pillar and having a generally vertically extending aperture providing an annular mounting edge. A sunshade support rod includes a generally horizontally extending elongated portion for supporting a sunshade and a frustoconical end portion which extends upwardly through the aperture in the base member and is resiliently seated against the mounting edge by a helical spring arrangement. The elongated portion is movable above the vertical axis of the end portion in a generally pivotal manner to allow sunshade use at the windshield or the adjacent side door window opening. During movement of the support rod between these positions, integral camming portions on the base member and support rod act against the spring to cam the end portion downwardly and tip it relative to the vertical. This camming action supplies a dipping movement to the elongated portion of the support rod and allows it to bypass roof mounted obstructions located in the plane it defines while in the use positions.

5 Claims, 4 Drawing Figures

PATENTED OCT 23 1973    3,767,256

SUNSHADE SUPPORT ASSEMBLY

BACKGROUND OF THE INVENTION

This invention relates generally to a sunshade support assembly that mounts a sunshade on a vehicle body roof for movement between a storage position generally within the plane of the roof, a first use position adjacent the vehicle body windshield, and a second use position adjacent a side door window opening.

It is well known to provide a sunshade support assembly including a base member mounted on a vehicle roof or windshield header in proximity to the upper end of the windshield side pillar to support a sunshade support rod having an elongated portion carrying a sunshade. Generally, the sunshade is pivotable about the longitudinal axis of the support rod between a storage position within the plane of the vehicle body roof and a first use position adjacent the windshield. From the first use position, the support rod is pivotally movable about a generally vertical axis through the base member to allow sunshade movement to a second use position adjacent a side door window opening rearward of the windshield side pillar. Generally, during movement between the first and second use position, the elongated portion of the support rod moves within the plane it defines while in these use positions. However, certain vehicle body roofs may have obstructions, such as rear-view mirrors, preventing sunshade movement in this plane.

SUMMARY OF THE INVENTION

This invention provides a sunshade support assembly in which a base member and sunshade support rod include camming portions for supplying a dipping movement to the sunshade during movement between windshield and side door window opening use positions and thus allowing the sunshade to bypass roof mounted obstructions.

In the preferred embodiment of the invention, the sunshade support assembly includes a base member with a vertically extending aperture providing an annular mounting edge. The sunshade support rod includes a horizontally extending elongated portion for carrying the sunshade and a frustoconical end portion extending generally upwardly through the aperture in the base member and resiliently seated against the mounting edge by a helical spring arrangement. The support rod is movable about the vertical axis of the end portion in a generally pivotal manner between windshield and side door window opening use positions. During movement between these positions, integral camming portions on the support rod and base member cam the end portion downwardly against the bias of the spring and tip it relative to the vertical. This camming action supplies a dipping movement to the sunshade allowing it to bypass roof mounted obstructions in the plane the elongated portion defines while in the use positions.

Accordingly, one feature of this invention is that it provides an improved sunshade support assembly in which the base member and support rod thereof include camming portions providing a dipping movement to the sunshade during movement between windshield and side door window opening use positions. Another feature of the invention is that the base member includes a vertically extending aperture defining an annular mounting edge which resiliently seats a vertically extending end portion of the support rod by a helical spring arrangement such that the end portion is cammed downwardly and tipped relative to the vertical by the camming portions against the bias of the spring to provide the dipping movement to the elongated sunshade carrying portion of the support rod. Another feature of the invention is that the end portion of the support rod has a downwardly enlarged frustoconical configuration and the camming portions are integral with the base member and support rod.

BRIEF DESCRIPTION OF THE DRAWINGS

An understanding of This invention is readily apparent from the following description of the preferred embodiment and the drawings in which.

DESCRIPTION OF THE PREFERRED EMBODIMENT

Figure 1:
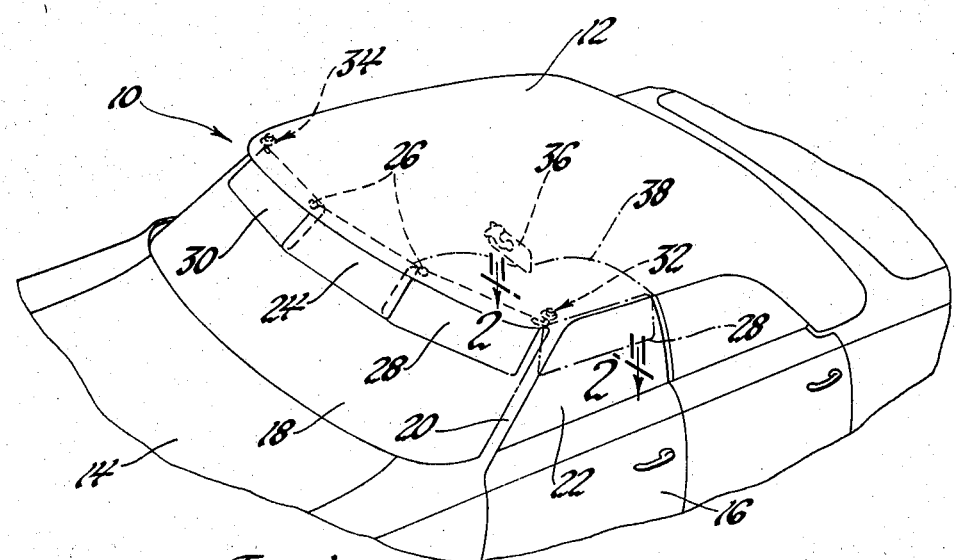
FIG. 1 is a perspective view of a portion of a vehicle body whose left-hand sunshade is supported by a sunshade support assembly, according to this invention, which supplies a dipping movement tp the sunshade during movement between the solid line indicated use position adjacent the windshield and the phantom line indicated use position adjacent the side door window opening to thus allow the sunshade to bypass the phantom line indicated rear-view mirror.

Referring to FIG. 1 of the drawings, a vehicle body generally indicated by 10 includes a roof 12, an engine compartment hood panel 14, and a front side door 16. A windshield 18 is bonded at its upper and lower edges by the roof 12 and hood panel 14 and at its lateral sides by side windshield pillars 20. A side door window 22 selectively closes a window opening rearward of each side windshield pillar in a conventional manner.

The upper center portion of windshield 18 is selectively shaded from the sun by a center sunshade 24 whose upper edge is supported by left and right-hand roof mounted support assemblies 26 for pivotal movement between the solid line indicated use position shown and a rearwardly extending storage position generally within the plane of roof 12. Left and right-hand side sunshades 28 and 30 selectively provide shading at the upper sides of windshield 18 and are supported at their outboard ends by support assemblies generally indicated by 32 and 34. These support assemblies selectively allow sunshade movement between the windshield use positions shown, rearward storage positions generally within the plane of roof 12, and side door window opening use positions as shown by the phantom line indicated position of sunshade 28. Support assembly 32 is constructed in a manner according to this invention to provide a dipping movement to sunshade 28 during movement between the use positions. This dipping movement allows sunshade 28 to bypass roof mounted obstructions, such as rear-view mirror 36, that would otherwise prevent movement of the sunshade between these use positions. The path of the free end of sunshade 28 during movement between these use positions is shown by a phantom line 38 to illustrate this dipping movement.

Figure 2:
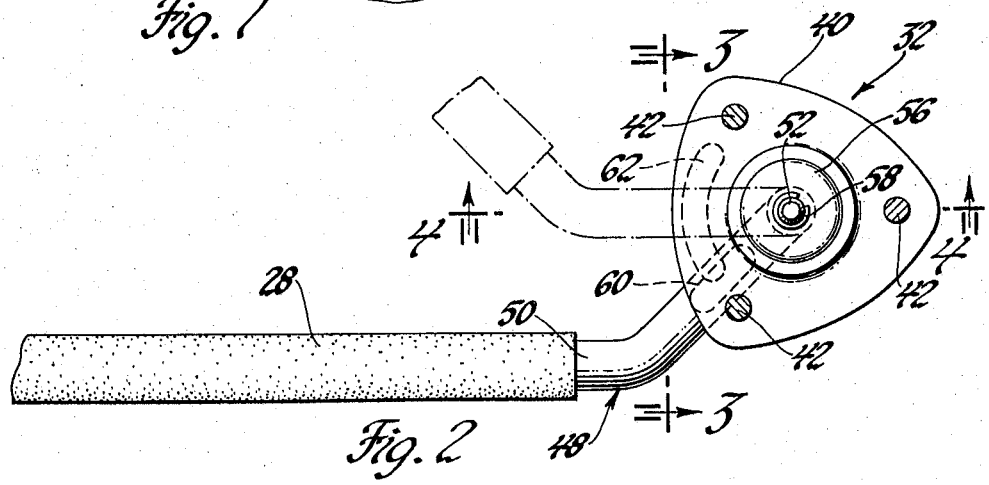
FIG. 2 is a top plan view of the sunshade support assembly taken generally along line 2—2 of FIG. 1 and showing the base member and sunshade carrying support rod thereof.
Figure 3:
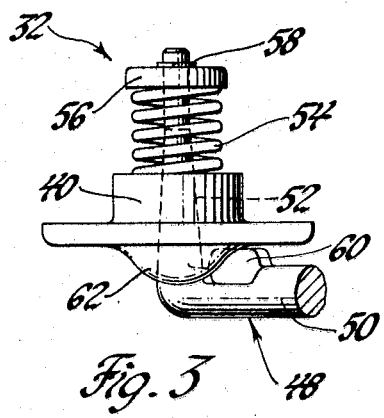
FIG. 3 is an elevation view of the support assembly taken generally along line 3—3 of FIG. 2 and showing the camming portions on the base member and support rod which supply the dipping movement to the sunshade during movement thereof between the use positions.
Figure 4:
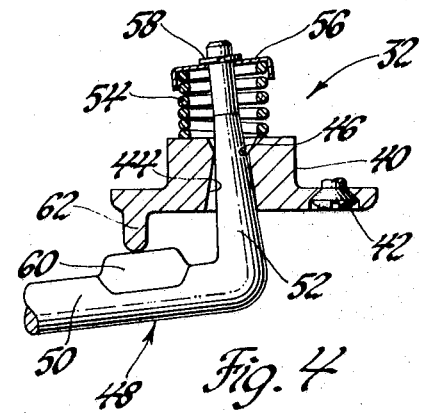
FIG. 4 is a sectional view taken generally along line 4—4 of FIG. 2 and showing the camming portions in engagement with each other to provide the dipping movement to the sunshade.

Referring additionally now to FIGS. 2 through 4, the support assembly 32 includes a base member 40 having apertured lobes allowing mounting of the base member on the vehicle roof 12 by way of screws 42. As seen in FIG. 4, the base member 40 has a vertically extending aperture 44 defined by upwardly and downwardly enlarged frustoconical portions whose juncture is at an annular mounting edge 46 of the base member, this mounting edge lying in a generally horizontally extending plane. The sunshade support rod generally indicated by 48 includes an elongated portion 50 which pivotally supports sunshade 28 for movement between the windshield use position and the storage position in the plane of roof 12 in a conventional manner. The support rod 48 also includes an integral frustoconical end portion 52 received within and extending upwardly through the aperture 44 in base member 40. A helical spring 54 sits on the upper side of base member 40 and engages an annular fitting 56 received by the upper end of end portion 52. A split snap ring 58 is received by a suitable annular groove in the end portion 52 to retain the annular fitting 56 against upward movement relative to end portion 52. The spring 54 thus biases end portion 52 to the generally vertical position of FIG. 3 where it engages the mounting edge 46 of base member 40 and extends generally normal to the plane of this mounting edge. This positioning maintains the elongated portion 50 of support rod 48 in a generally horizontally extending orientation while in either of the use positions to maintain the sunshade 28 generally horizontal.

Between the sunshade 28 and the end portion 52, the elongated portion 50 of support rod 48 has a bend of approximately 45°, see FIG. 2, and also includes an integral camming portion 60 formed by a suitable pinching operation. During pivotal movement of the sunshade 28 between the windshield and side door window opening use positions, the camming portion 60 engages an inverted bell-shaped camming portion 62 integral with the base member 40, see FIG. 3 also. Engagement of the camming portions 60 and 62 moves the end portion 52 and the support rod 48 downwardly and tips the support rod to the FIG. 4 position such that the sunshade moves with the dipping movement shown by the phantom line 38 in FIG. 1. This movement thus allows the sunshade 28 to bypass the rear-view mirror 36 or any other obstruction that lies in the plane defined by the elongated portion 50 of support rod 48 while positioned in the two use positions, and this action occurs without any deliberate occupant effort toward this end.

The invention thus provides an improved sunshade support assembly.

What is claimed is:

1. A sunshade support assembly comprising, a base member for mounting on a vehicle roof adjacent the upper end of a windshield pillar in proximity to the outboard end of the winshield and the forward end of a side door window opening, a sunshade support rod having an elongated portion for supporting a sunshade and an end portion extending generally normal to the longitudinal axis of the elongated portion, means mounting the end portion of the support rod on the base member to support the elongated portion of the support rod for generally pivotal movement between a first position allowing sunshade use at the windshield and a second position allowing sunshade use at the side door window opening, and engageable camming portions on the base member and support rod, one of the camming portions having a generally bell-shaped configuration so as to provide a dipping movement to the elongated portion of the support rod as the camming portions engage each other during movement of the support rod between the first and second positions and thus allowing the sunshade to bypass obstructions located in the plane defined by the elongated portion of the support rod while in the first and second positions.

2. A sunshade support assembly comprising, a base member for mounting on a vehicle roof adjacent the upper end of a windshield pillar in proximity to the outboard end of the windshield and the forward end of a side door window opening, the base member having a generally vertically extending mounting aperture defining a generally annular mounting portion lying in a generally horizontal plane, a sunshade support rod having an elongated portion for supporting a sunshade and an end portion extending generally normal to the longitudinal axis of the elongated portion, resilient means maintaining the end portion of the support rod within the mounting aperture of the base member and in engagement with the annular mounting portion to mount the support rod for generally pivotal movement between a first position allowing sunshade use at the windshield and a second position allowing sunshade use at the side door window opening, and engageable camming portions on the base member and support rod, one of the camming portions having a generally bell-shaped configuration so as to provide a tipping movement to the end portion of the support rod and a dipping movement to the elongated portion thereof as the camming portions engage each other during movement of the support rod between the first and second positions and thus allowing the sunshade to bypass obstructions located in the plane defined by the elongated portion of the support rod while in the first and second positions.

3. A sunshade support assembly comprising, a base member for mounting on a vehicle roof adjacent the upper end of a windshield pillar in proximity to the outboard end of the windshield and the forward end of a side door window opening, the base portion having a generally vertically extending mounting aperture defining a generally annular mounting edge lying in a generally horizontal plane, a sunshade support rod having an elongated portion for supporting a sunshade and an end portion integral with the elongated portion and extending generally normal to the longitudinal axis thereof with a generally frustoconical configuration which is enlarged in a direction toward the elongated portion, the end portion of the support rod being received within the aperture of the base member and extending upwardly therethrough, a helical spring extending between the upper end of the end portion and an upper portion of the base member to bias the end portion upwardly into engagement with the annular mounting edge and mount the support rod for generally pivotal movement between a first position allowing sunshade use at the windshield and a second position sunshade use at the side door window opening, and engageable camming portions on the base member and support rod, one of the camming portions having a generally bell-shaped configuration so as to move the end portion downwardly against the bias of the spring as the camming portions engage each other during movement of the support rod between the first and second positions and thereby provide a tipping movement to the end portion and a dipping movement to the elongated portion so as to allow the sunshade to bypass obstructions located in the plane defined by the elongated portion while the support rod is in the first and second positions.

4. The sunshade support assembly of claim 3 wherein the camming portions are respectively integral with the base member and support rod.

5. The sunshade support assembly of claim 4 wherein the camming portion of the base member has the bell-shaped configuration and wherein this configuration is inverted.

* * * * *